(12) United States Patent
Gotoh

(10) Patent No.: US 7,610,274 B2
(45) Date of Patent: Oct. 27, 2009

(54) METHOD, APPARATUS, AND PROGRAM FOR RETRIEVING DATA

(75) Inventor: Taeko Gotoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 11/169,447

(22) Filed: Jun. 29, 2005

(65) Prior Publication Data

US 2006/0004728 A1 Jan. 5, 2006

(30) Foreign Application Priority Data

| Jul. 2, 2004 | (JP) | ............................. 2004-196454 |
| Jul. 26, 2004 | (JP) | ............................. 2004-217369 |

(51) Int. Cl.
 *G06F 7/00* (2006.01)
 *G06F 17/30* (2006.01)
(52) U.S. Cl. ................................. 707/3; 707/4; 715/210
(58) Field of Classification Search ............... 707/1–10, 707/100–104.1, 200–206
See application file for complete search history.

(56) References Cited

U.S. PATENT DOCUMENTS

| 5,680,478 A | 10/1997 | Wang |
| 6,400,853 B1 | 6/2002 | Shiiyama |
| 6,631,373 B1 * | 10/2003 | Otani et al. ..................... 707/5 |
| 2002/0136468 A1 * | 9/2002 | Sun ............................ 382/305 |

FOREIGN PATENT DOCUMENTS

| JP | 10-260983 A | 9/1998 |
| JP | 10-289251 A | 10/1998 |
| JP | H10-340272 A | 12/1998 |
| JP | 2002-297610 A | 10/2002 |
| JP | 2003-108580 A | 4/2003 |

OTHER PUBLICATIONS

Microsoft Computer Dictionary, Microsoft Press (2002) pp. 483, 410.*
Hyun Sung Chang et al., Efficient video indexing scheme for content-based retrieval, Dec. 1999, vol. 9, 1269-1279.*
Aoe et al., A trie compaction algorithm for a large set of keys, Jun. 1996, vol. 8, 476-491.*

* cited by examiner

*Primary Examiner*—Jean B Fleurantin
(74) *Attorney, Agent, or Firm*—Canon USA Inc IP Division

(57) ABSTRACT

A method for retrieving data includes a displaying step of displaying data including a plurality of attributes, a first selecting step of selecting a data segment functioning as a search key from the displayed data, a determining step of determining an attribute of the search key, and a searching step of searching a database by a search method corresponding to the determined attribute of the search key.

13 Claims, 15 Drawing Sheets

FIG. 13
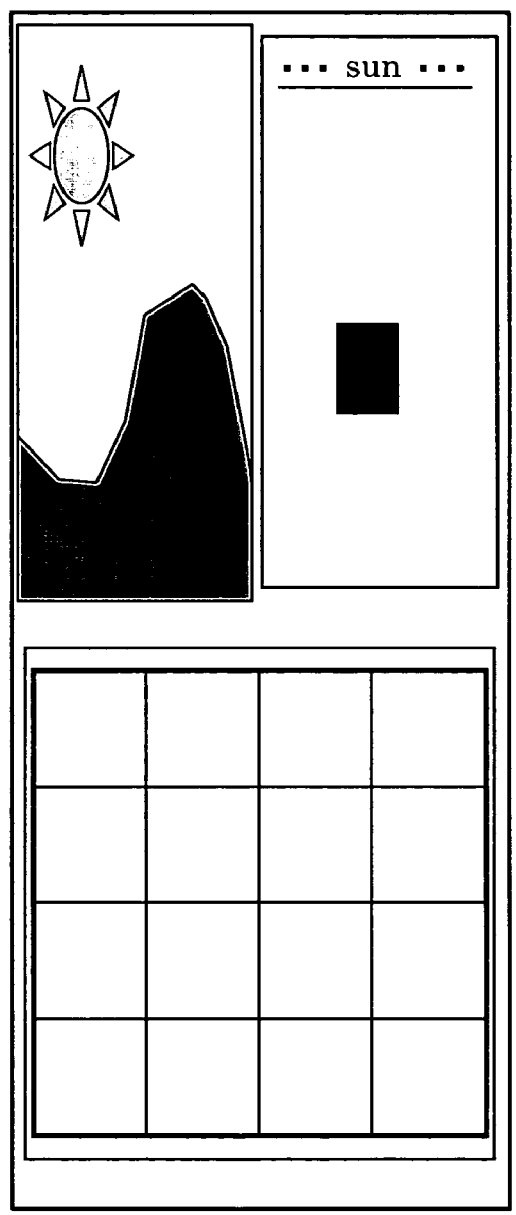
SEARCH FIELD ADVANCE SETTINGS
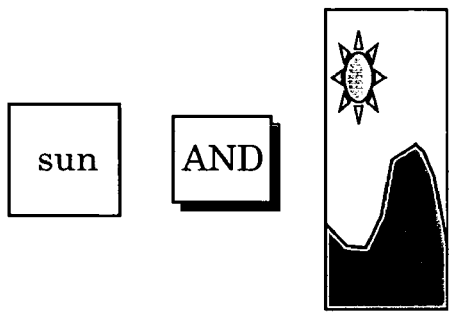
SEARCH METHOD
■ SIMILAR IMAGE SEARCH
☐ KEYWORD SEARCH
SEARCH METHOD
■ SIMILAR IMAGE SEARCH
☐ KEYWORD SEARCH
SEARCH LOCATION
■ DB1
■ DB2
SEARCH LOCATION
■ DB1
■ DB2
☐ DELETE THIS ITEM   ☐ DELETE THIS ITEM
                1301

METHOD, APPARATUS, AND PROGRAM FOR RETRIEVING DATA

BACKGROUND OF THE INVENTION

1. Field of the Invention

The present invention relates to a method, an apparatus, and a program for data retrieval operations.

2. Description of the Related Art

Current multifunction peripherals (MFPs) are becoming more and more sophisticated in functionality. More specifically, MFPs enabling not only copying and printing, but also scanning and faxing are now mainstream. Such an MFP plays an important role as a port for input and output of paper information and electronic data in offices.

In particular, the scanning capabilities of MFPs allow efficient conversion from large amounts of documents in paper form to electronic data. Therefore, documentation management by scanning documents quickly and storing produced data in a database on a network or in a database contained in an MFP is increasing. (Hereinafter, data produced by converting paper documents into electronic form by scanning is referred to as "document image").

Due to the spread of personal computers (PCs), creating documents is usually realized by the use of applications in PCs. (Hereinafter, electronic documents created by the use of applications are referred to as "electronic documents".)

Compared to documents printed on paper, document images and electronic documents are advantageous in that data can be reedited and reused, data can be easily shared by many people, data does not suffer degradation over time, and the like. On the other hand, paper documents have the advantages of ease of reading and handling, convenience of portability, intuitive understandability, and the like. Therefore, there are many instances where outputting electronic documents or document images in paper form is efficient usage.

It also often happens that document images or electronic documents identical with or similar to paper documents are required to reedit or reuse data.

Examples of such an instance include a situation in which new material is required to be created based on a paper material distributed at a meeting and a situation in which printing out the original data is required since a paper document is partly damaged. Under the present conditions, however, a person who needs material must contact another person who prepared the material to receive an electronic document of the material in most cases. In other words, people cannot obtain an electronic file without contacting other people in most cases. This impairs ease of reuse of documents.

Accordingly, a technique for quickly retrieving a document image or an electronic document by a paper document in order to efficiently perform documentation management is necessary.

In general, documents in offices and homes include text, photographs, figures, or tables, or a combination of these. When such document information is stored in a database, examples of possible retrieving methods include the following:

1. Retrieving relevant data by a word or phrase functioning as a search key;

2. Retrieving similar image data by an image feature amount of the entire document image, the image feature amount functioning as a search key; and 3. Where information added to a document image is set as a search key, retrieving data containing the information.

Search key represents digital data of a word, a phrase, graphics, and the like functioning as an index for information retrieval.

For partial data retrieval, a divided region of a photograph, text, or the like within a document image is set as the search key.

Japanese Patent Laid-Open No. 2002-297610 discloses a retrieval technique by determining a logic operator corresponding to one or more user-specified regions in an image.

Japanese Patent Laid-Open No. 10-289251 discloses a retrieval method including the steps of preparing keyword icons graphically representing individual data sets stored in a database, displaying a search-condition setting window, and placing at least one keyword icon in the search-condition setting window to set the search condition.

For searching data including a plurality of attributes, optimal search methods vary with the attributes. Therefore, a retrieval operation is rendered complicated and difficult. As a result, a series of data retrieval operations become too burdensome for users who are inexperienced at computer operations. Thus, there is a need for a technique for facilitating such an operation.

SUMMARY OF THE INVENTION

The present invention is directed to a technique for facilitating an operation for searching data.

In one aspect of the present invention, a search key is selected from data that is divided according to attributes and that appears on a display screen. A search expression is created using the search key and a logic operator. A database is searched by a search method corresponding to the search key. The results obtained by a plurality of search methods are output in accordance with the search expression.

A process of setting the search expression and the logic operator is facilitated. More specifically, when a data segment functioning as the search key is selected from displayed data including a plurality of attributes by a pointing operation, the search expression is then set in accordance with the pointing operation. When the pointing operation draws a specified path, it is recognized that a specified logic operator is selected by following a predetermined rule.

Further features of the present invention will become apparent from the following description of exemplary embodiments with reference to the attached drawings.

BRIEF DESCRIPTION OF THE DRAWINGS

FIG. 13 shows a selection of a search key area and a logic operator and a visualization of a search expression according to the ninth embodiment.

DESCRIPTION OF THE EMBODIMENTS

The embodiments of present invention are described below with reference to the drawings.

First Embodiment

Figure 1:
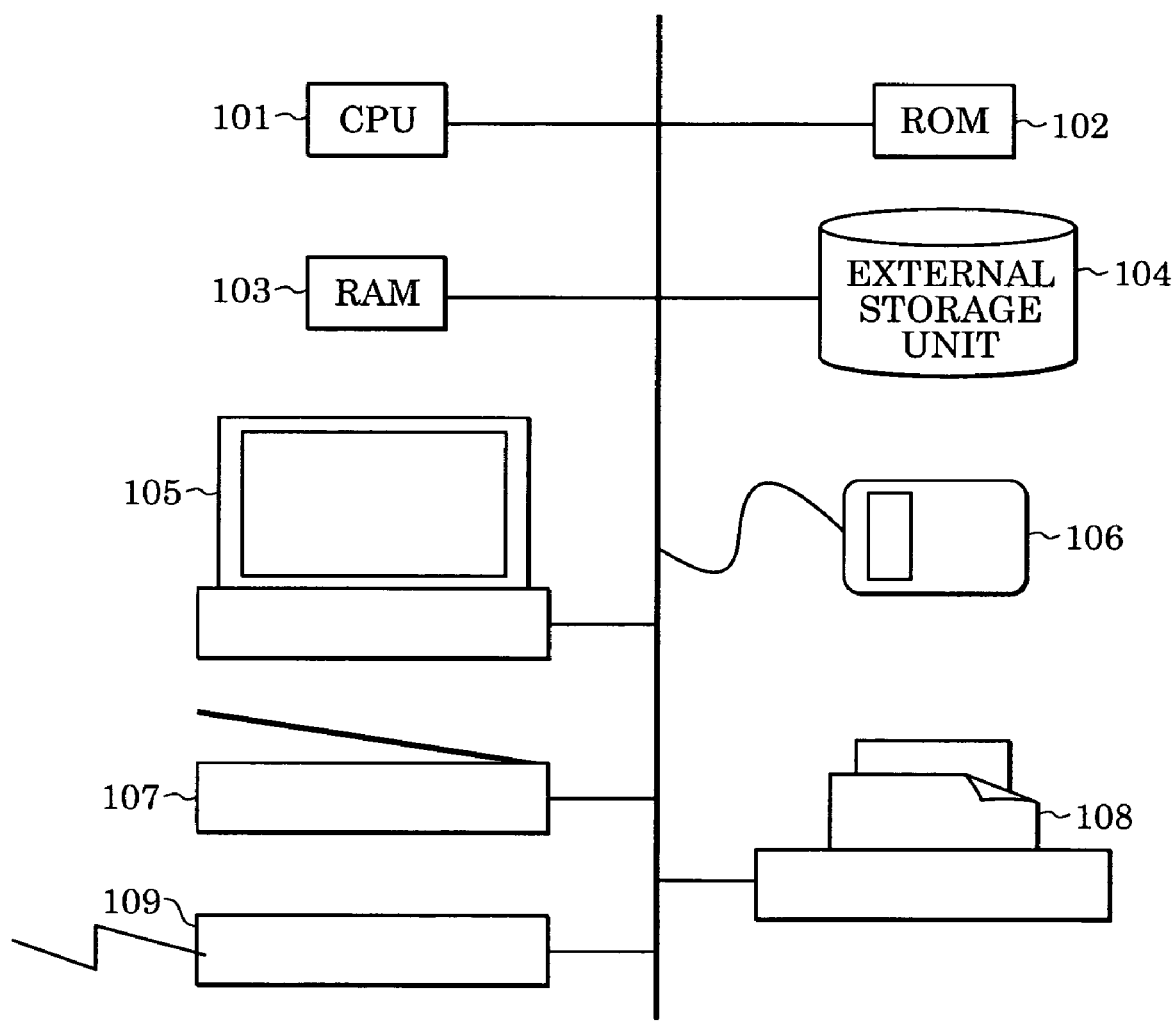
FIG. 1 is a block diagram of an apparatus for retrieving data according to an embodiment of the present invention.

FIG. 1 is a block diagram of a data retrieving apparatus for realizing an embodiment of the present invention. A central processing unit (CPU) 101 controls the entire system of this apparatus in accordance with a control program stored in a read-only memory (ROM) 102. The ROM 102 stores one or more programs for controlling the apparatus, including a program for performing processing as illustrated in a flowchart described below, for execution by the CPU 101. A random-access memory (RAM) 103 stores a document image and the like. An external storage unit 104 is, for example, a magnetic disk. A data display unit 105 is, for example, a display. A pointing device 106 is, for example, a mouse, a trackball, a pen-shaped device used in a liquid-crystal touch panel. A data input unit 107 is, for example, an image scanner.

The present invention can also be embodied in general purpose computers. In this case, a control program supplied from a medium, or the like, may be stored in the external storage unit 104, and the control program may be executed by the CPU 101 in response to instructions from a user. A network interface (I/F) 109 can communicate with a remote device (not shown), thus allowing a program and data to be read and written. These components are connected with a wireless communication or a wire communication. A data output unit 108, such as a printer, may be connected to this system. The data display unit 105, the data input unit 107, the data output unit 108, and the like may be connected to this system with an interface therebetween.

Figure 2:
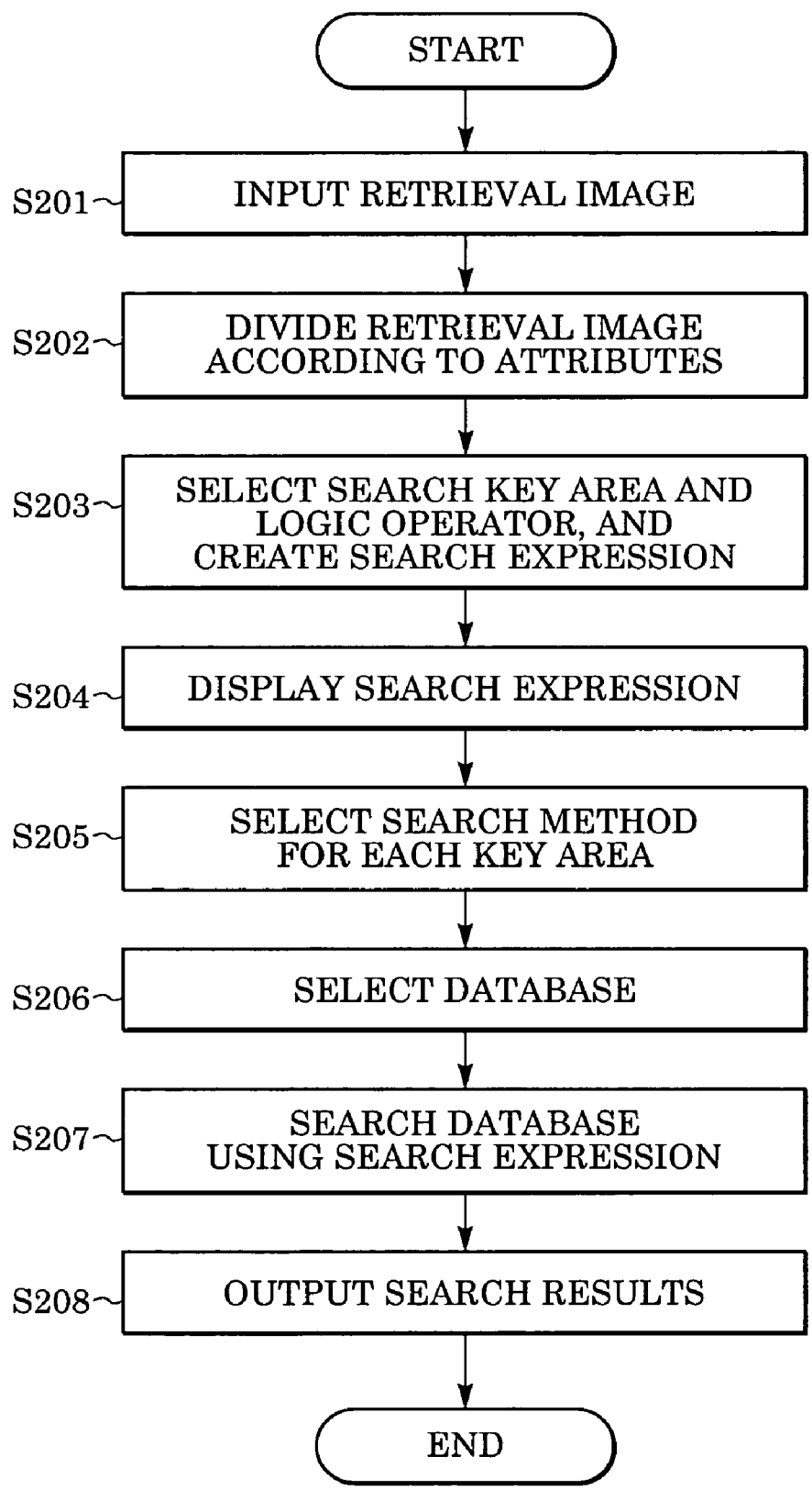
FIG. 2 is a flowchart of a method for retrieving data according to a first embodiment.

FIG. 2 is a flowchart of a method for retrieving data according to a first embodiment. The processing according to this embodiment is described with reference to FIG. 2. In step S201, a user inputs a retrieval image, for which the user aims to retrieve data. In this embodiment, the retrieval image is input from the data input unit (image scanner) 107 shown in FIG. 1 or the like. However, the retrieval image may be any data as long as it includes a plurality of attributes. The retrieval image may be input from alternative terminals. The retrieval image may also be data existing in a terminal.

Figure 3:
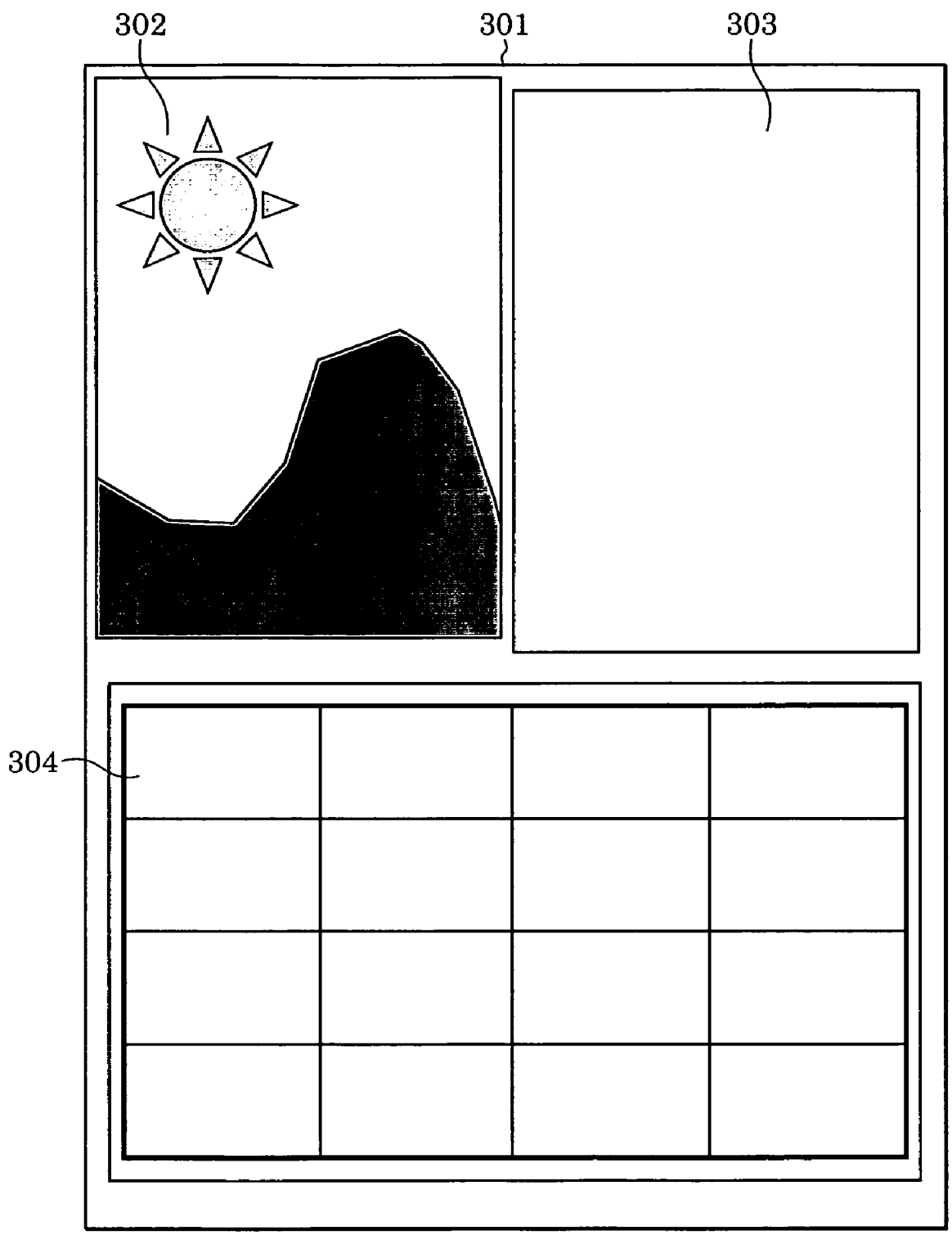
FIG. 3 shows a region segmentation of a retrieval image according to the first embodiment.
Figure 4:
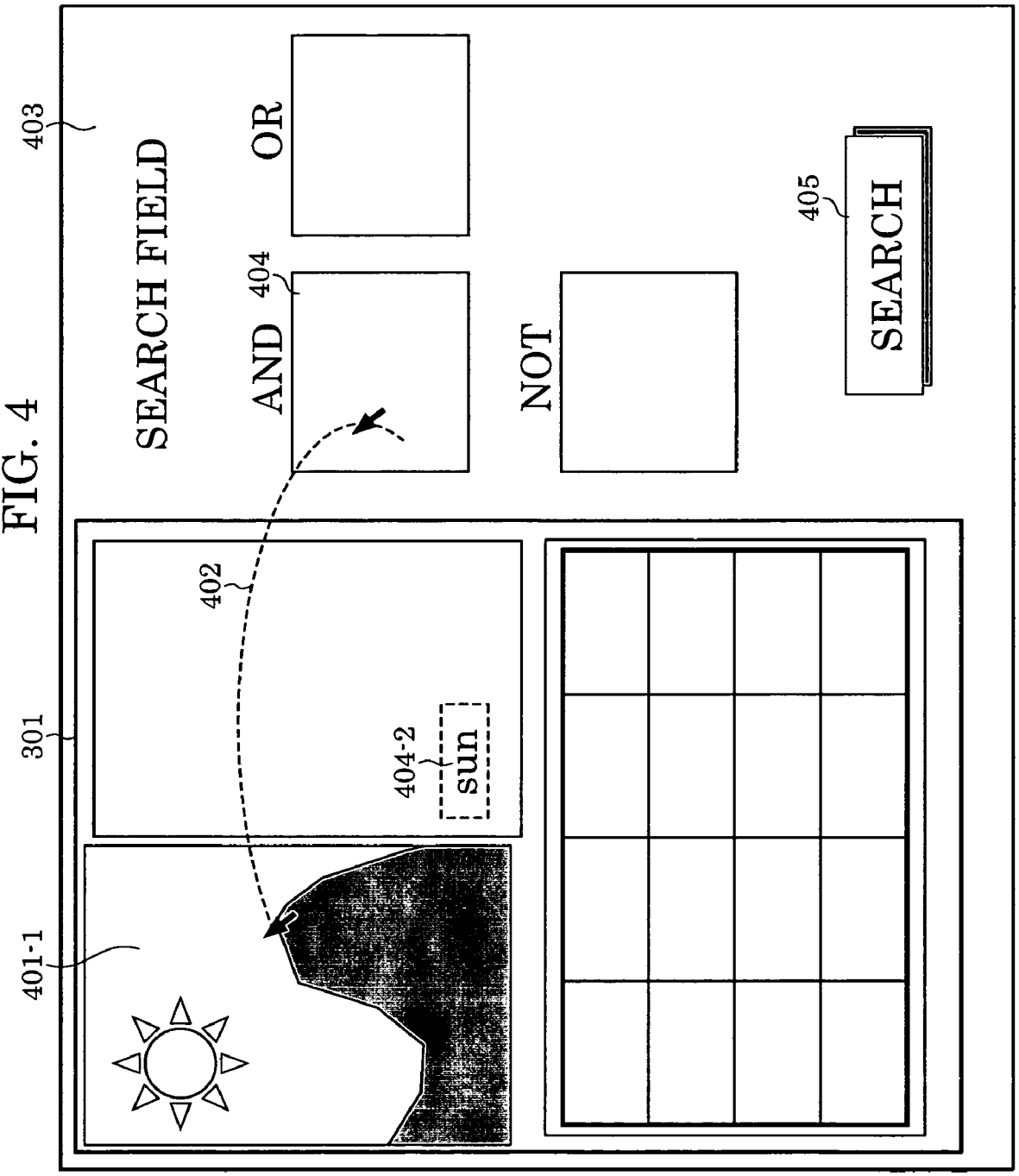
FIG. 4 shows a selection of a search key and a logic operator according to the first embodiment.

In step S202, the retrieval image is divided into regions according to attributes. The term "attributes" herein indicate the names of the type of the features of regions. The attributes are represented by text, a photograph, a table, graphics, and the like. The processing is described with reference to FIG. 3. A document image 301 is the retrieval image input in step S201. As shown in FIG. 4, this image is presented to a user in such a way that the image is displayed on a screen for a search operation of the data display unit 105. The document image 301 is divided into regions 302, 303, and 304 according to individual attributes on the basis of individual feature amounts extracted from the document image 301. A region segmentation technique is disclosed in, for example, U.S. Pat. No. 5,680,478 (assigned to Canon Kabushiki Kaisha). In this disclosed technique, a set of blackened pixel blocks and a set of white pixel blocks in a document image are extracted, and regions having the names of the features, such as text, picture, table, frame, line, and the like, are extracted from the document image in accordance with the amounts of features, such as shape, size, and state of the set. The document image 301 is divided into a photographic region 302, a textual region 303, and a tabular region 304. This is visualized such that the regions into which the document image 301, which is the retrieval image, is divided have different frame colors from each other according to their attributes, so that a user can easily recognize the regions.

In step S203, an area for search is selected from the regions produced in the previous step and a logic operator is selected, thus creating a search expression. The processing is described with reference to FIG. 4. One or more search keys by which a user intends to perform a search are specified. Each of the search keys can be specified by an operation, such as enclosing a desired area using the pointing device 106, pointing to the desired area with the pointing device 106, or the like. In FIG. 4, a region 401-1 is pointed to by the pointing device. In other words, a region produced by a process of dividing the image into the regions is set as the search key. The search keys may be selected from not only one document image but also multiple document images. The same applies to the embodiments described below. Next, the specified search key is pointed to by the pointing device and is then dragged and dropped into a box in a search field 403. In FIG. 4, a mouse pointer is moved to an AND box 404, which represents the "AND" logic operator, while drawing a path 402. An area of the region may be set as the search key, as shown by an area 404-2. In this case, a target area is selected by being enclosed using the pointing device, the area is pointed to by the pointing device, and the area is dragged and dropped into a box in the search field 403. Multiple search keys may be selected. A combination of the logic operators may be used. A search expression is created from the operation described above. Upon selecting a SEARCH button 405 (e.g., by clicking on the button using the pointing device), the processing moves to the next step (step S204), so that a screen of the data displaying unit (e.g., the data display unit 105) is switched to that shown in FIG. 5.

Figure 5:
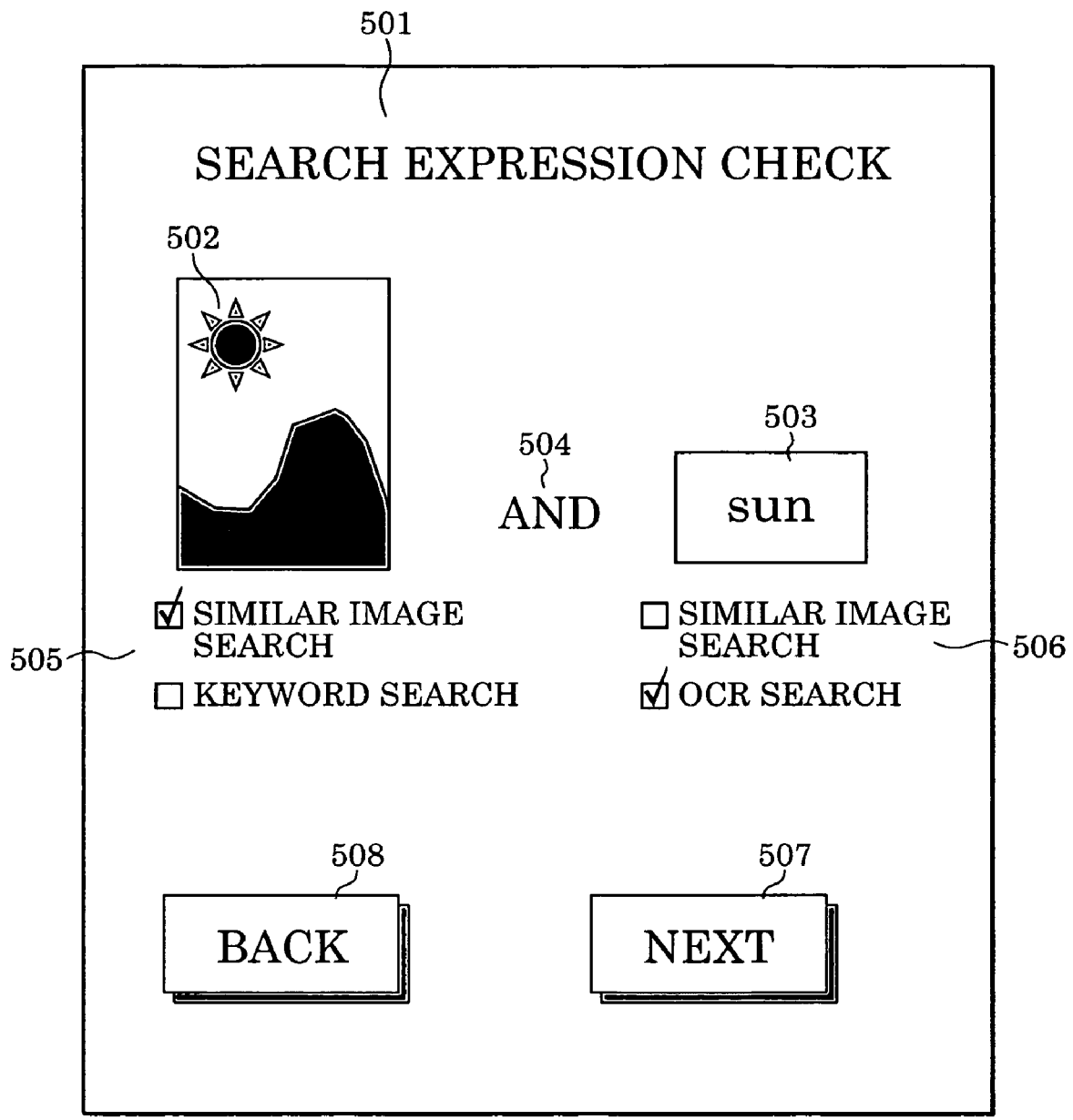
FIG. 5 shows a visualized search expression and a determination of a search method on a screen according to the first embodiment.

In step S204, the search keys and the logic operator selected in the previous step are displayed. In step S205, a search method is selected for each search key. In FIG. 5, a screen 501 displays the search expression. The search keys selected in step S203 are shown by search-key thumbnails 502 and 503. The logic operator selected in step S203 is shown by a logic operator 504. Menus 505 and 506 show search methods. By using these menus, a user can select a suitable search method for each search key. If an image is selected as the search key, a similar-image search method for retrieving a similar image in accordance with the feature amount of the search key and a keyword search method for searching a keyword corresponding to the search key are possible options, for example. If characters are selected as the search key, a similar-image search method for recognizing the search key (characters) as an image and retrieving a similar image and an optical character recognition (OCR) search method for searching for a keyword obtained from OCR processing of the search key are possible options, for example. A suitable search method for each search key is selected by a user. The screen 501 in FIG. 5 shows that the similar-image search is to be performed for the search-key thumbnail 502, the OCR search, which performs a keyword search from the text obtained from the OCR processing, is to be performed for the search-key thumbnail 503, and a search condition is the logical product of the results of both search operations. A similar-image search technique is disclosed in, for example, Japanese Patent Laid-Open No. 10-260983. In this disclosed technique, an appropriate image search while ensuring some degree of ambiguity by absorbing some difference in image feature amount due to a change in image angle or object position or photographing conditions can be performed. The screen of the data displaying unit (e.g., the data display unit 105) is switched to that shown in FIG. 4 by selecting a BACK button 508 with the pointing device. After the selection of the search method for each search key, upon selecting a NEXT button 507 with the pointing device, the processing moves to the next step, so that the screen for a search operation of the data displaying unit (e.g., the data display unit 105) is switched to that shown in FIG. 6.

Figure 6:
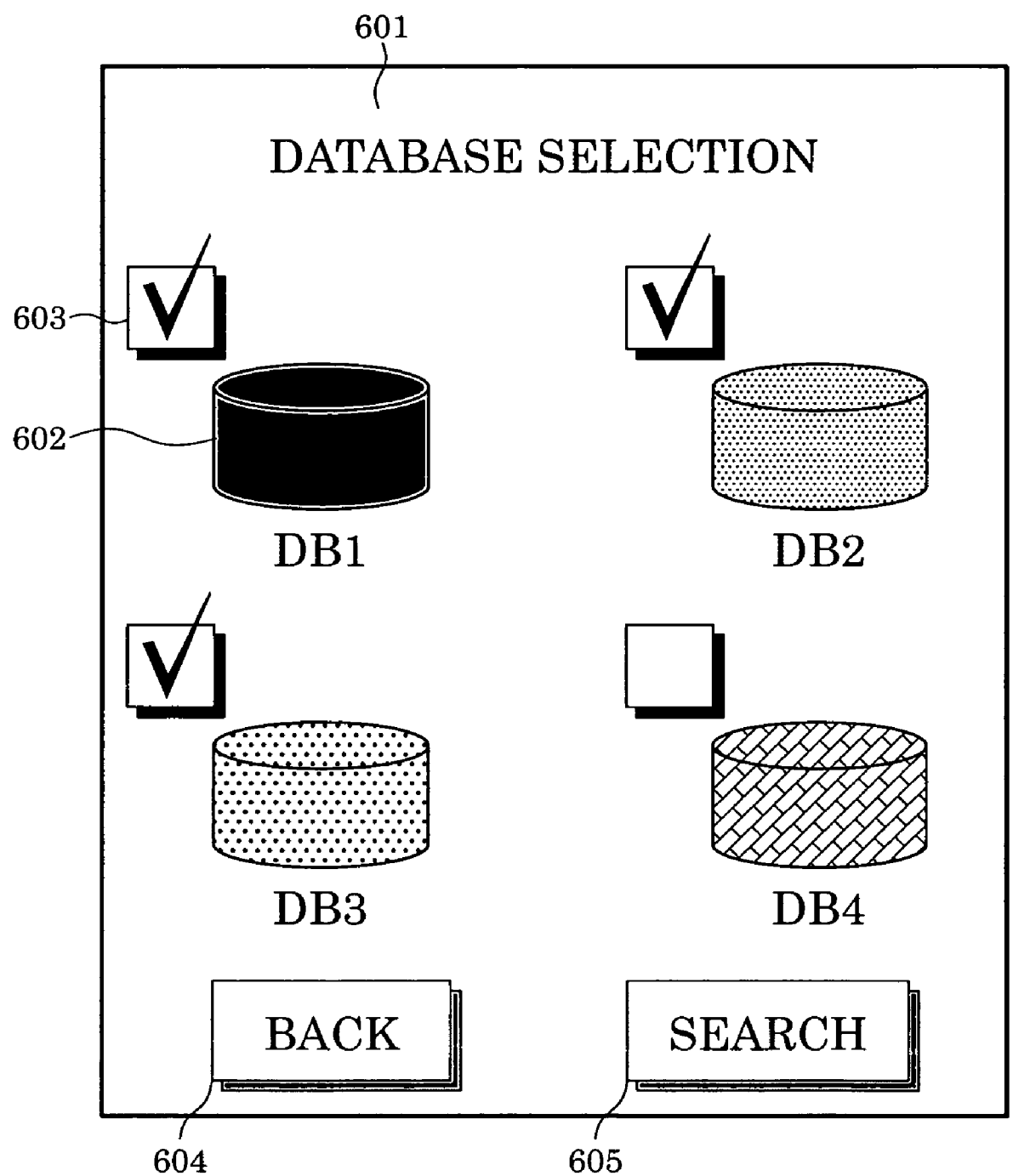
FIG. 6 shows a selection of a database to be searched according to the first embodiment.

In step S206, a database to be searched is selected. The processing is described with reference to FIG. 6. In FIG. 6, a screen 601 displays possible databases 602 for a search operation. The screen 601 may display detailed information, such as a database location. A database to be searched is selected by pointing to any one of check boxes 603 using the pointing device. The screen of the data displaying unit (e.g., the data display unit 105) is switched to that shown in FIG. 5 by selecting a BACK button 604 using the pointing device. A SEARCH button 605 is used for starting a search operation. Upon selecting the SEARCH button 605 using the pointing device, the processing moves to the next step. In the screen 601 of FIG. 6, databases DB1, DB2, and DB3 are selected (as indicated by checks in the associated checkboxes 603).

In step S207, each of the databases is searched using the search expression. The database may be stored in the external storage unit 104 or a remote device (not shown) via the network I/F 109. The database contains an electronic document and document image that are stored in advance. As an index for search, metadata (e.g., a structured document with a tree structure) for information regarding the regions into which the electronic document and document image are divided according to attributes is added. A search operation is performed by a search method determined for each search key by pressing the SEARCH button 605, thus producing the search results. If multiple search keys are set, individual search results are subjected to logical operations. In this embodiment, the search expression is created in steps S205 and S206 with the following condition:

<Search Key and Search Method>

Search 1:

Search Key/search-key image 502 in FIG. 5

Search Method/similar image search

Search 2:

Search Key/search-key image 503 in FIG. 5

Search Method/OCR search, which searches for a keyword obtained from text data produced by OCR processing <Logical Expression>

Logical production of search 1 and search 2

<Database to be Searched>

Three databases DB1, DB2, and DB3

In step S208, the search results produced in step S207 are displayed and output. The processing is described with reference to FIG. 7. A screen 701 displays the search results produced in step S207. In this embodiment, data similar to the search-key image 502 and having the keyword produced by character-recognizing the search-key image 503 is retrieved and displayed. Retrieved document image and electronic document are represented by thumbnails 702-1 to 702-4. The thumbnail 702-1 is the prime candidate, and it includes an image similar to the search-key image 502 and has the title of "sun" resulting from the character recognition of the search-key image 503.

Figure 7:
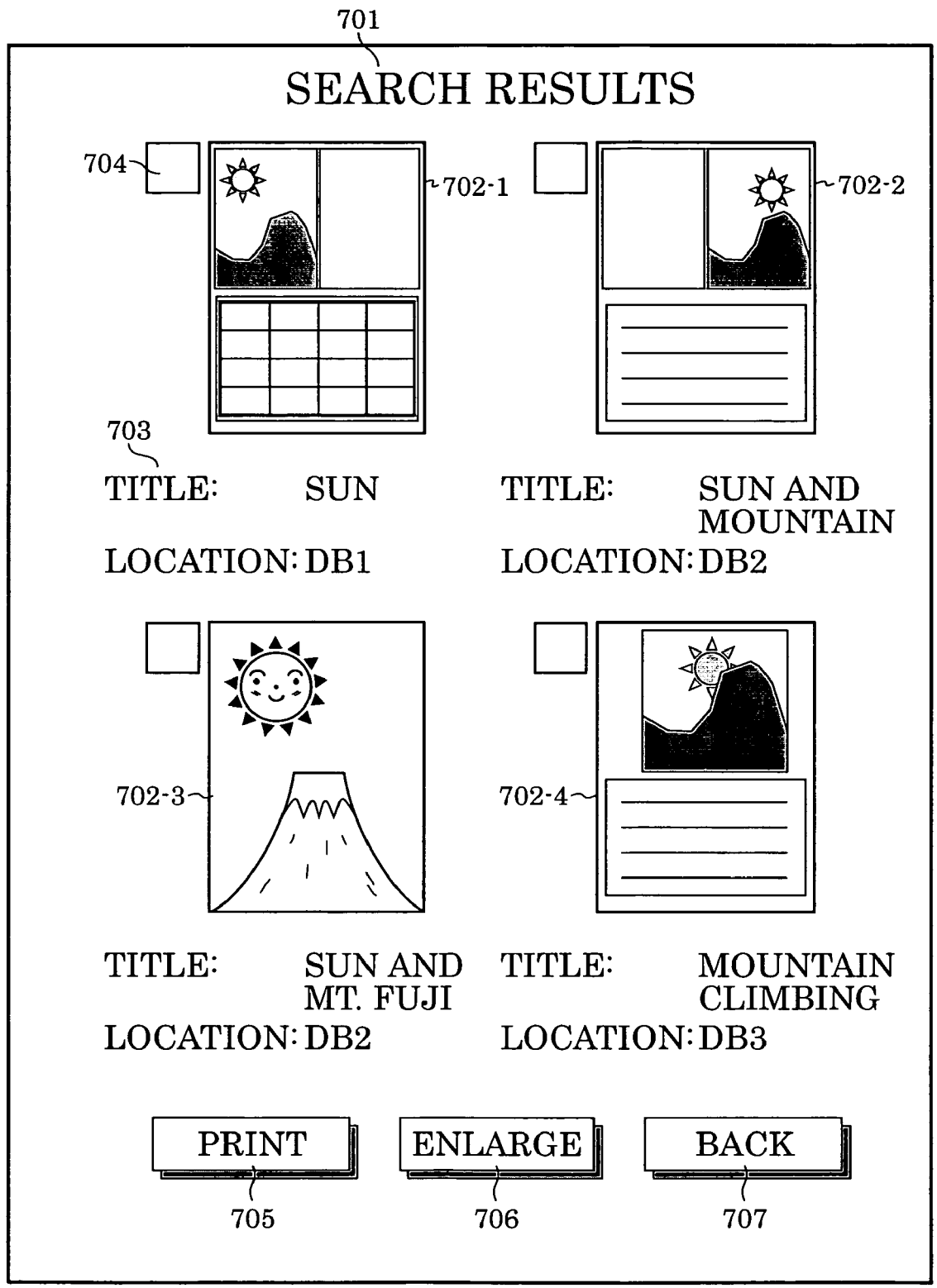
FIG. 7 shows an example of the search results according to the first embodiment.

The thumbnail 702-2 is the second candidate, and it includes an image similar to the search-key image 502 and has the title including the word "sun". However, the thumbnail 702-2 is less similar than the thumbnail (prime candidate) 702-1 is. The thumbnail 702-3 is the third candidate, and it is similar to the search-key image 502 and has the keyword associated with the data including the word "sun". However, the thumbnail 702-3 is less similar than the first candidate 702-1 and the second candidate 702-2. The thumbnail 702-4 is the fourth candidate. It includes an image similar to the search-key image 502, and the result of the character-recognition of a text region in the image includes the word "sun". In general, similar image searches are realized by extracting the feature amounts of colors, shapes, and the like, from images and comparing the extracted feature amounts to those from the retrieval image. Therefore, the similar image searches do not depend on file sizes or resolutions. Accordingly, the search results may include images having different sizes, as shown in FIG. 7. Information 703 indicates the detailed information of the candidate data sets 702-1 to 702-4. The detailed information includes the titles of the data sets and the names of the databases storing the data sets. The data sets can be selected and deselected by pointing to radio buttons 704 using the pointing device. A PRINT button 705 is used for printing. The selected data set is output to the data output unit (e.g., printer) by selecting the PRINT button 705 using of the pointing device. An ENLARGE button 706 is used for displaying enlarged data. Upon selecting the ENLARGE button 706 using the pointing device, the screen of the data displaying unit (e.g., the data display unit 105) is switched to a screen displaying the enlarged selected data set. The screen of the data displaying unit (e.g., the data display unit 105) is switched to that shown in FIG. 6 by pointing to a BACK button 707 using the pointing device.

Second Embodiment

In the first embodiment, a single search method is selected with respect to each search key. However, multiple search methods may be selected with respect to each search key. More specifically, the comparison of the first and second embodiments is as follows:

<Search Key and Search Method in First Embodiment>

Search 1:

Search Key/search-key image 502 in FIG. 5

Search Method/similar image search

Search 2:

Search Key/search-key image 503 in FIG. 5

Search Method/OCR search, which searches for a keyword obtained from text data produced by the OCR processing <Search Key and Search Method in Second Embodiment>

Search 1:

Search Key/search-key image 502 in FIG. 5

Search Method/similar image search

Search 1':

Search Key/search-key image 502 in FIG. 5

Search Method/keyword search in accordance with a keyword added to the image

Search 2:

Search Key/search-key image 503 in FIG. 5

Search Method/OCR search, which searches for a keyword obtained from text data produced by the OCR processing As described above, the two search methods can be selected for the single search-key image 502. The search results are integrated, and the integrated result is output, as in the first embodiment.

Third Embodiment

Figure 8:
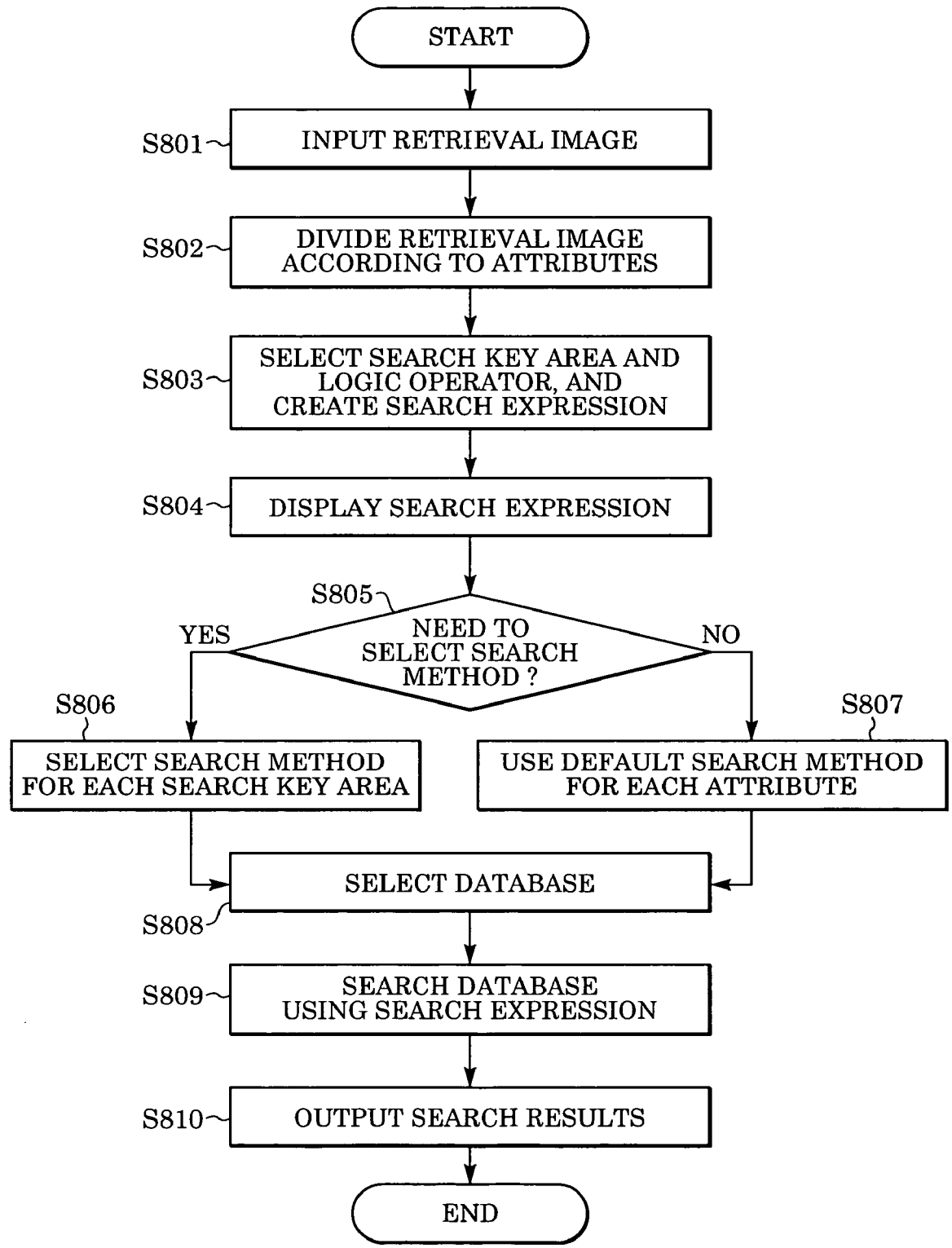
FIG. 8 is a flowchart of a method for retrieving data according to a third embodiment.

In the first embodiment, the search method for each search key is selected by a user every time a search operation is performed. In the case when the search operation is carried out multiple times, the operations of selecting search methods are redundant. In the third embodiment, a default search method can be used. The processing is described with reference to the flowchart of FIG. 8.

In step S801, a retrieval image is input from the data input unit (image scanner) 107 or the like.

In step S802, the retrieval image is divided into regions according to attributes. The term "attributes" herein indicate the names of the type of the features of regions. The attributes are represented by text, a photograph, a table, graphics, and the like.

In step S803, one or more search key areas are selected from the regions produced in the previous step and a corresponding logic operator is selected, thus creating a search expression.

In step S804, the search keys and the logic operator selected in the previous step are displayed.

In step S805, a user selects whether or not to select advanced settings for a search method for each search key. If the advanced settings are selected, the processing moves to step S806. If not, the processing moves to step S807.

In step S806, the user selects the search method for each search key.

In step S807, a default search method is used for each attribute.

In step S808, (after selecting the search method (step S806) or using the default search method (step S807)) one or more databases to be searched are selected.

In step S809, each of the databases is searched using the search expression. The database may be stored in the external storage unit 104 or a remote device (not shown) via the network I/F 109.

In step S810, the search results produced in step S809 are displayed and output.

Figure 9:
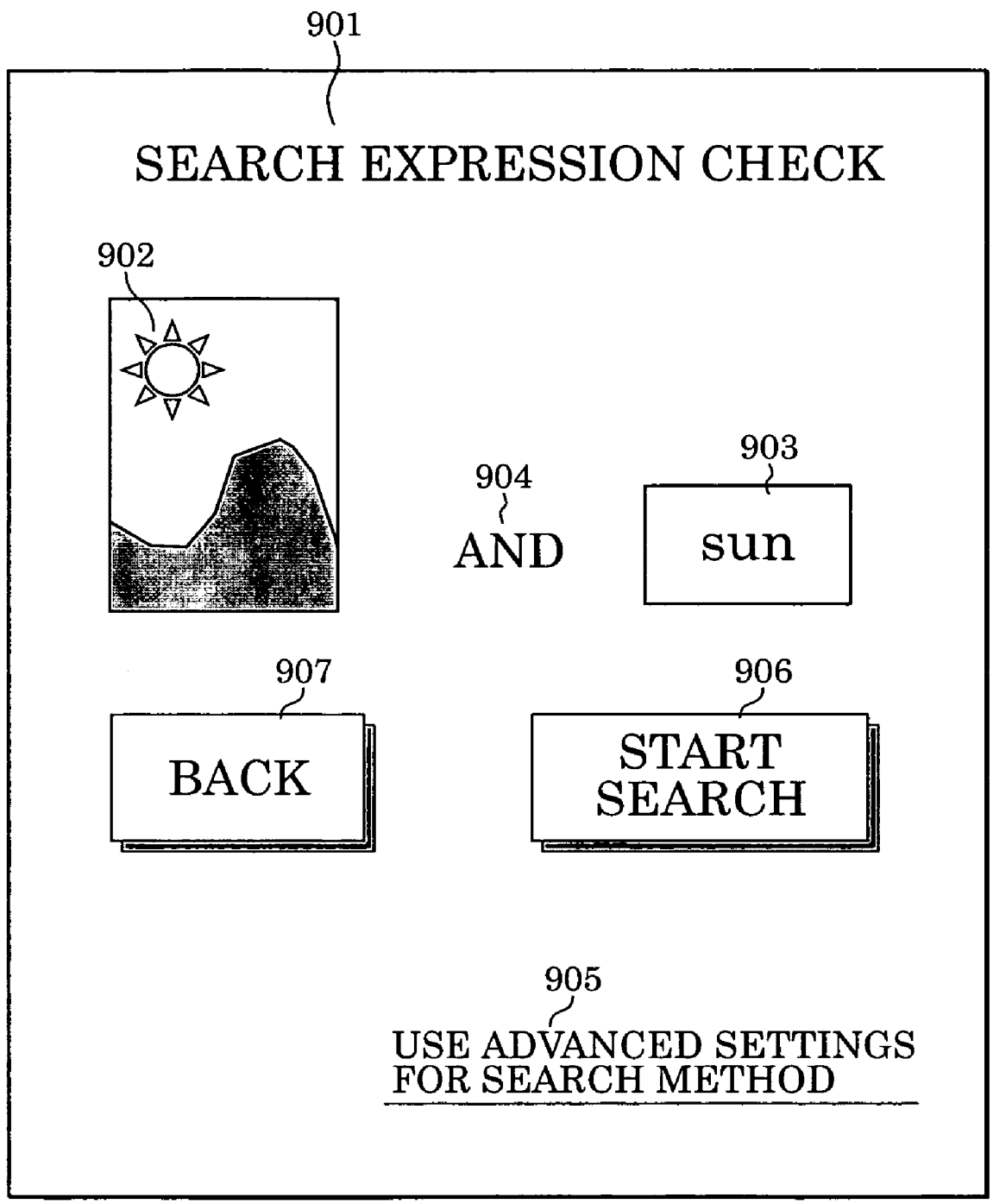
FIG. 9 is a visualized search expression and a determination of the search expression on a screen according to the third embodiment.

The processing of steps S805, S806, and S807 are described with reference to FIG. 9.

In the first embodiment, a user selects a search method for each search key. In the third embodiment, a search method for each attribute is selected in advance, and the selected method is set as a default method. The processing moves to step S808 by pressing a START SEARCH button 906. A user can select a search method for each search key, as shown in FIG. 5, by pressing a button 905 to "Use Advanced Settings for Search Method".

Fourth Embodiment

In the third embodiment, a single search method is selected with respect to each attribute and the selected search method functions as a default method. However, multiple search methods may be selected with respect to each attribute, like the second embodiment.

Fifth Embodiment

Figure 10:
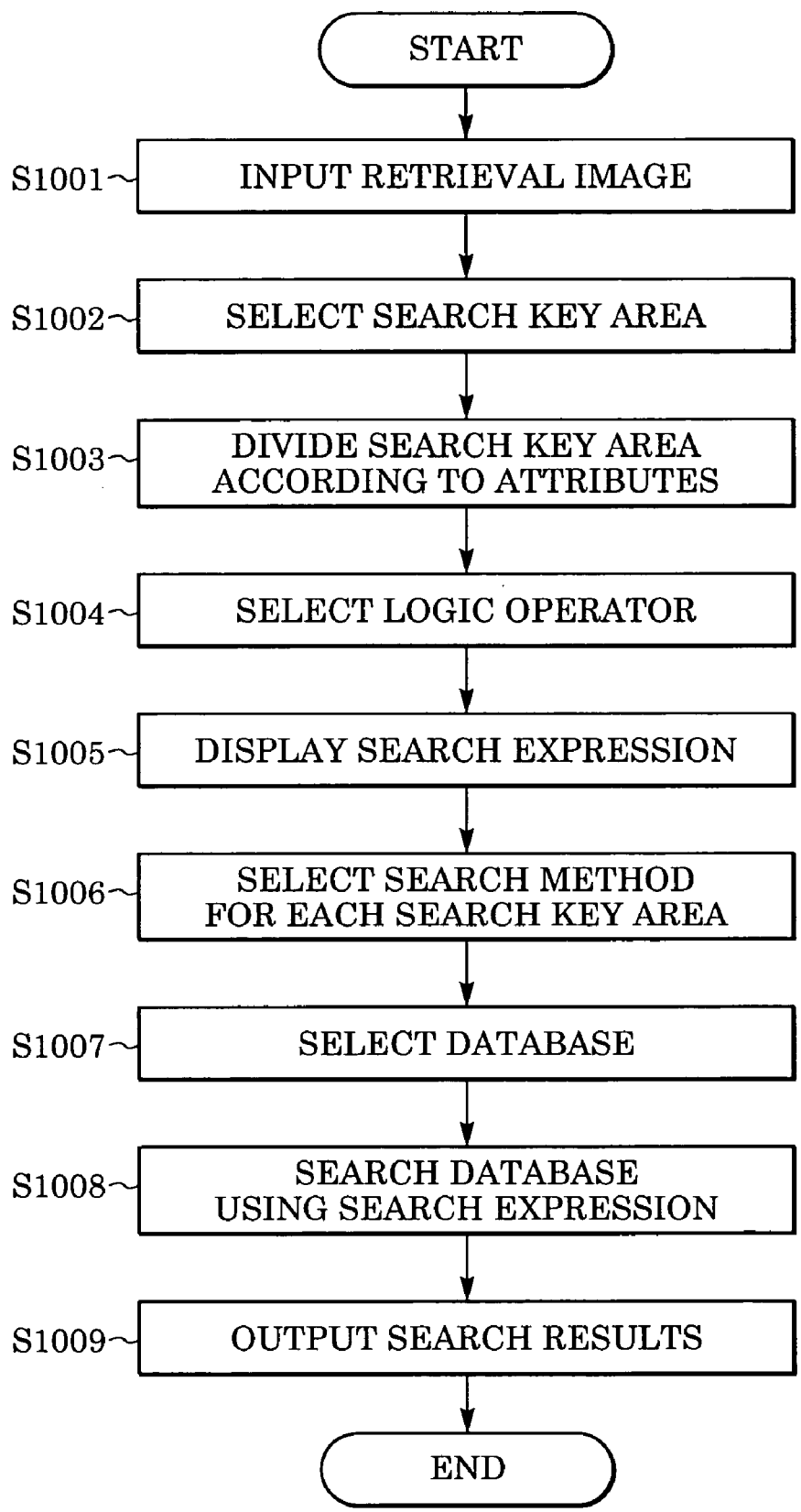
FIG. 10 is a flowchart of a method for retrieving data according to a fifth embodiment.

In the first embodiment, after the entire retrieval image is divided into regions according to attributes, a search expression is created. If a search key used for a search operation is part of the entire retrieval image, such a region segmentation process is redundant. The processing according to the fifth embodiment is described with reference to the flowchart of FIG. 10.

In step S1001, a retrieval image is input from the data input unit (image scanner) 107 or the like.

In step S1002, one or more search keys are specified. Each of the search keys can be selected from the retrieval image input in step S1001 by selecting a search key area in a rectangular shape using the pointing device. The search key area can be selected across different attributes.

In step S1003, the selected search key area is divided according to the attributes. The term "attributes" indicate the names of the types of the features of regions. The attributes are represented by text, a photograph, a table, graphics, and the like.

In step S1004, a logic operator is selected.

In step S1005, the selected search key and the selected logic operator are displayed.

In step S1006, a user selects a search method for each search key.

In step S1007, one or more databases to be searched are selected.

In step S1008, each of the databases is searched using a search expression, which is created from the search key and the logic operator. The database may be stored in the external storage unit 104 or a remote device (not shown) via the network I/F 109.

In step S1009, the search results produced in step S1008 are displayed and output.

Sixth Embodiment

In the fifth embodiment, a single search method is selected with respect to each search key. However, multiple search methods may be selected with respect to each search key, like the second embodiment.

Seventh Embodiment

Figure 11:
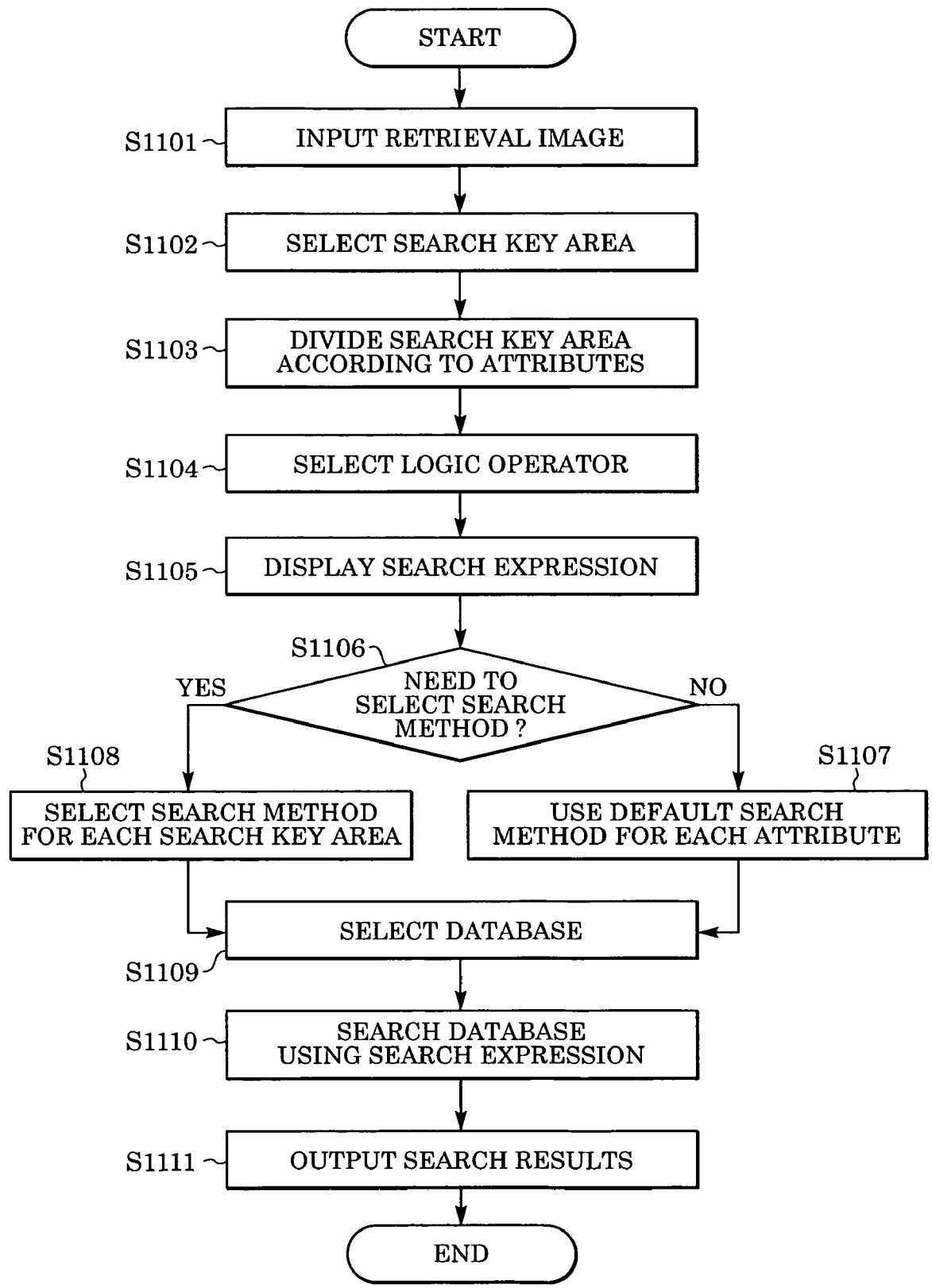
FIG. 11 is a flowchart of a method for retrieving data according to a seventh embodiment.

In the fifth embodiment, a search method for each search key is selected by a user every time a search operation is performed. In the case when the search operation is carried out multiple times, the operations of selecting search methods are redundant. Therefore, in the seventh embodiment, a default search method can be used. The processing is described with reference to the flowchart of FIG. 11.

In step S1101, a retrieval image is input from the data input unit (image scanner) 107 or the like.

In step S1102, one or more search keys are selected. Each of the search key can be selected from the retrieval image input in step S1101 by selecting a search key area in a rectangular shape using the pointing device. The search key area can be selected across different attributes.

In step S1103, the selected search key is divided according to the attributes.

In step S1104, a logic operator is selected.

In step S1105, the selected search key and the selected logic operator are displayed.

In step S1106, a user selects whether or not to select advanced settings for a search method for each search key. If the advanced settings are selected, the processing moves to step S1108. If not, the processing moves to step S1107.

In step S1107, a default search method is used for each attribute.

In step S1108, the user selects the search method for each search key.

In step S1109, (after using a default search method (step S1107) or selecting the search method (step S1108)) one or more databases to be searched are selected.

In step S1110, each of the databases is searched using a search expression, which is crated from the search key and the logic operator. The database may be stored in the external storage unit 104 or a remote device (not shown) via the network I/F 109.

In step S1111, the search results produced in step S1110 are displayed and output.

Eighth Embodiment

In the seventh embodiment, a single search method is selected with respect to each search key. However, multiple search methods may be selected with respect to each search key, like the second embodiment.

Ninth Embodiment

In the second embodiment, selecting a logic operator to create a search expression is realized by dragging a search key and dropping it in a box representing the logic operator. However, the search expression may be created by moving any one of prepared buttons representing logic operators so as to align the button with search keys. Additionally, a screen for checking a search expression, as shown in FIG. 5, and a screen for selecting a database, as shown in FIG. 6, may be displayed together in the same screen.

Figure 12:
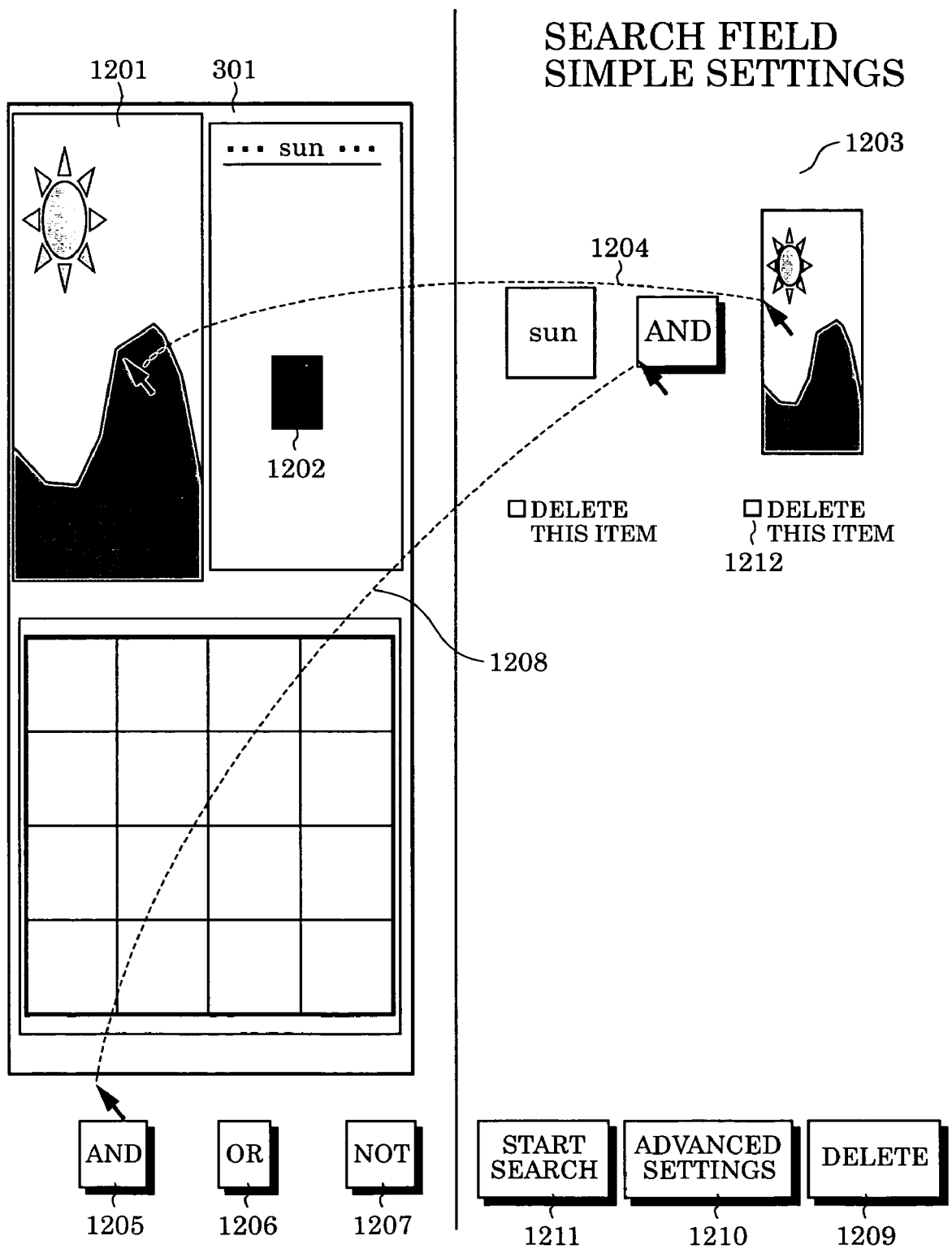
FIG. 12 shows a selection of a search key area and a logic operator and a visualization of a search expression according to a ninth embodiment.

The processing is described with reference to FIG. 12. FIG. 12 shows a screen for creating a search expression from a retrieval image and for displaying the created search expression. First, a search key area is specified. For example, the search key area is specified by enclosing a desired area using the pointing device, pointing to the desired area with the pointing device, or clicking the desired area using the pointing device. The search key area may also be specified by moving the pointing device.

In FIG. 12, areas 1201 and 1202 are candidates for search key areas. Next, an entry operation of the search key areas is carried out. Specifically, each of the specified search key areas is pointed to by the pointing device and dragged and dropped in a search field 1203. The search key area may be recognized as the entire data having one attribute or as a data segment specified by a method using the pointing device.

A process for entering a logic operator is the same as that for the search key area. Any one of logic operator buttons 1205, 1206, and 1207 is dragged and dropped in the search field 1203. In FIG. 12, the "AND" button 1205 is dragged and dropped in the search field 1203 while drawing a path 1208 with a mouse pointer. The entry of the search key area, which was entered by being dragged in the search field 1203, can be cancelled by selecting a delete this item option 1212, such as a checkbox, and pressing a DELETE button 1209. For performing advanced settings for a search method in accordance with the attributes of the search key areas, a user calls up a screen for advanced settings (shown in FIG. 13) by pressing an ADVANCED SETTINGS button 1210 in FIG. 12. In the advanced settings screen shown in FIG. 13, the user selects a search method, such as a similar image search, an OCR search, or the like, for example by making selections using a menu 1301. Then, a search operation is performed by selecting a START SEARCH button 1211 (FIG. 12) or 1302 using the pointing device.

Tenth Embodiment

In the first and ninth embodiments, the search expression is created by dragging the search key area to the search field using the pointing device. In the tenth embodiment, the search expression is created without a dragging operation to the search field. This is effective when the data display unit 105 is small, for example.

Step S203 (FIG. 2) in this embodiment is described with reference to FIG. 14. The search key area is specified by a gesture (movement) of the pointing device. Examples of such a gesture include enclosing a desired area using the pointing device, pointing to the desired area using the pointing device, clicking the desired area using the pointing device, or moving the pointing device.

Figure 14:
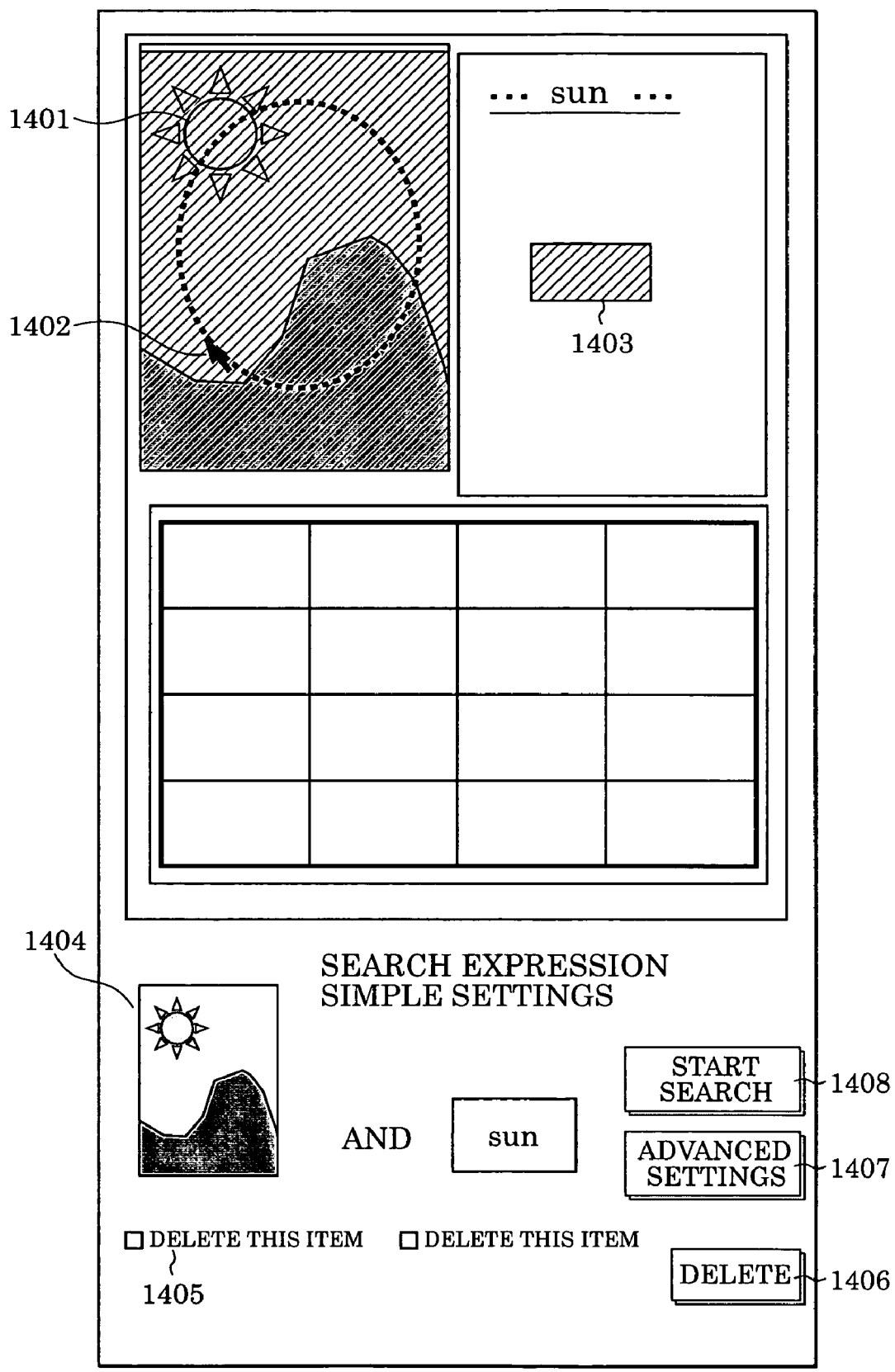
FIG. 14 shows a selection of a search key area and a logic operator and a visualization of a search expression according to a tenth embodiment.

In FIG. 14, areas 1401 and 1403 are selected as search key areas. A path 1402 is drawn by the pointing device 106. A logic operator and a search key area associated therewith are selected by a position pointed to by the pointing device or a path drawn by the pointing device. For selection of the logic operator, a rule for assigning the logic operators in accordance with paths is set in advance. For example, a circle path is assigned to the logic operator "AND". The logic operator is determined by drawing an associated path by operating the pointing device on the selected search key area. Selecting the search key area and drawing a path may be performed simultaneously. The logic operators "OR" and "NOT" are associated with respective paths. The logic operator is determined by alternative operations. For example, the logic operator may be determined by the number of clicks of the pointing device or any event of the pointing device.

Step S204 (FIG. 2) in this embodiment is described with reference to FIG. 14. The search expression created in step S203 is visualized. The search expression that a user desires is displayed on a screen 1404 for setting search expressions without being processed. A frame color or a background color of the selected search key area may be changed according to the selected logic operator to distinguish the selected search key area. For example, FIG. 14 shows a situation in which a search operation regarding the search key areas 1401 and 1403 by "AND" search is to be performed. In this case, the search key areas 1401 and 1403 have a background color corresponding to the "AND" search. The thumbnails of the selected search key areas and the selected logic operator are displayed on the screen 1404 such that the thumbnails retain information regarding the background color. The entered search key can be cancelled by selecting a menu 1405 and pressing a DELETE button 1406.

Figure 15:
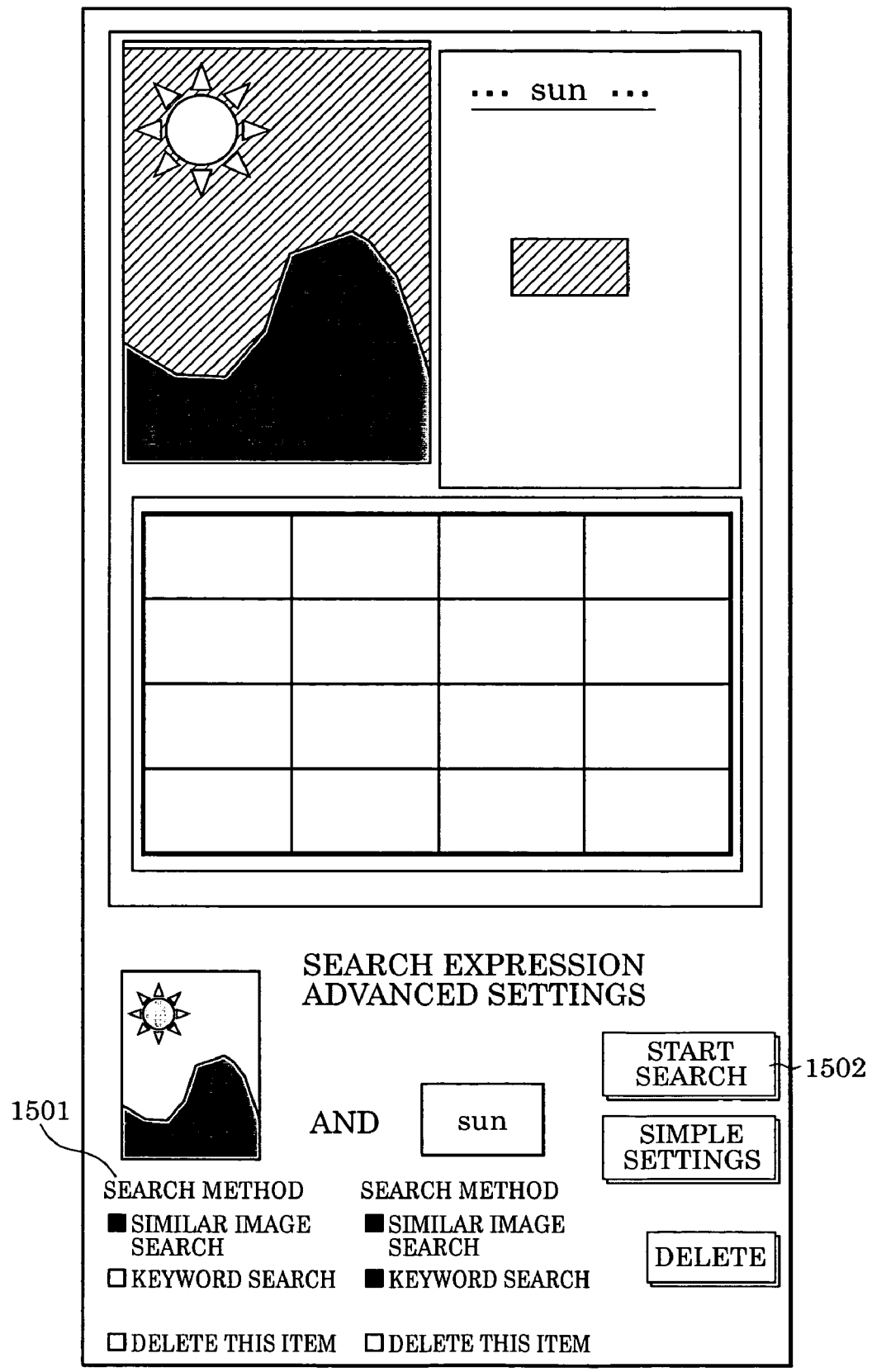
FIG. 15 shows a selection of a search key area and a logic operator and a visualization of a search expression according to the tenth embodiment.

For selecting advanced settings for each search key area, a user calls up a screen for search expression advanced settings (shown in FIG. 15) by pressing an ADVANCED SETTINGS button 1407 and selects a menu 1501 or the like. Then, a search operation is performed by pointing to a START SEARCH button 1408 or 1502 using the pointing device.

Eleventh Embodiment

In the first to tenth embodiments, a retrieval image is a document image to which an electronic document is converted. However, the retrieval image may be a document image to which a document that a user handwrites an image to be retrieved is converted.

Twelfth Embodiment

In the eleventh embodiment, a document is scanned and formed into a document image, the document image is divided into regions, and a search key is then specified. Alternatively, information that a user directly writes on a touch panel may be used as the search key.

As described above, according to the first to twelfth embodiments, the optimal search results can be output even when a user does not consider attributes of an image.

The present invention can be realized by supplying a storage medium storing program code for realizing the features of the embodiments described above to a system or an apparatus and reading and executing the program code stored in the storage medium by a computer (CPU or MPU (micro-processing unit)) of the system or the apparatus.

In this case, the program code read from the storage medium realizes the features of the embodiments.

Examples of storage media for supplying such program code include a flexible disk, a hard disk, a magneto-optical disk (MO), a compact disc read-only memory (CD-ROM), a CD-recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM.

In addition to the execution of program code read by a computer, performing actual processing in part or in entirety by an operating system (OS) running on the computer on the basis of an instruction of the program code can realize the features of the embodiments described above.

Additionally, program code read from a storage medium is written on a memory included in a feature expansion board inserted into a computer or in a feature expansion unit connected to the computer, and a CPU included in the feature expansion board or the feature expansion unit performs actual processing in part or in entirety on the basis of an instruction of the program, thus realizing the features of the embodiments described above.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2004-196454 filed Jul. 2, 2004 and 2004-217369 filed Jul. 26, 2004, which are hereby incorporated by reference herein.

What is claimed is:

1. A method for retrieving data from a database, comprising:
    displaying data including a plurality of attributes;
    selecting a plurality of segments from the displayed data;
    determining an attribute of each of the plurality of segments, wherein an attribute of a first one of the plurality of segments is a text attribute, and an attribute of a second one of the plurality of segments is a non-text attribute;
    setting a first search key and a second search key, wherein text data corresponding to the text attribute of the first one of the plurality of segments is set as the first search key, and non-text data corresponding to the non-text attribute of the second one of the plurality of segments is extracted and set as the second search key;
    setting a search expression using the plurality of segments, and a logic operator, wherein the logic operator corresponding to a predetermined path drawn by a pointing operation is set in the setting step; and
    searching the database, based on the first search key and the second search key, by using a search method corresponding to the first search key and the second search key, respectively,
    wherein the non-text attribute comprises at least one of an image, a photograph, a table, graphics, figures, a picture, a frame, or a line.

2. The method according to claim 1, wherein the selecting step further selects a search method from a plurality of search methods displayed, wherein the non-text attribute is the image, the table, or the graphics.

3. The method according to claim 1, wherein the searching step comprises performing a search in accordance with a search expression, the search expression being set using the plurality of segments and a logic operator.

4. The method according to claim 3, wherein the search expression is set using the first one of the plurality of segments and the second one of the plurality of segments.

5. The method according to claim 3, wherein the search comprises a single search based on both of the first search key and the second search key.

6. The method according to claim 1, further comprising an outputting step of outputting integrated search results from a plurality of search methods.

7. The method according to claim 1, wherein the search expression is displayed.

8. The method according to claim 1, wherein the pointing operation is any one of a drag-and-drop operation, a click operation, an operation of drawing a path, and a moving operation.

9. The method according to claim 1, wherein the pointing operation is a motion of a pointing device on one of a display screen and a touch panel.

10. The method according to claim 1, wherein one of a background color and a frame color of the selected segment is changed in the selecting step.

11. The method according to claim 1, wherein the non-text attribute comprises the image.

12. An apparatus for retrieving data from a database, comprising:
    a displaying unit configured to display data including a plurality of attributes;

a selecting unit configured to select a plurality of segments from the displayed data;

a determining unit configured to determine an attribute of each of the plurality of segments, wherein an attribute of a first one of the plurality of segments is a text attribute, and an attribute of a second one of the plurality of segments is a non-text attribute;

a first setting unit configured to set a first search key and a second search key, wherein text data corresponding to the text attribute of the first one of the plurality of segments is set as the first search key, and non-text data corresponding to the non-text attribute of the second one of the plurality of segments is extracted and set as the second search key;

a second setting unit configured to set a search expression using the plurality of segments, and a logic operator, wherein the logic operator corresponding to a predetermined path drawn by a pointing operation is set by the second setting unit; and a searching unit configured to search the database, based on the first search key and the second search key, by using a search method corresponding to the first search key and the second search key, respectively, wherein the non-text attribute comprises at least one of an image, a photograph, a table, graphics, figures, a picture, a frame, or a line.

13. A computer readable storage medium storing a program for causing a computer to execute steps of:

displaying data including a plurality of attributes;

selecting a plurality of segments from the displayed data;

determining an attribute of each of the plurality of segments, wherein an attribute of a first one of the plurality of segments is a text attribute, and an attribute of a second one of the plurality of segments is a non-text attribute;

setting a first search key and a second search key, wherein text data corresponding to the text attribute of the first one of the plurality of segments is set as the first search key, and non-text data corresponding to the non-text attribute of the second one of the plurality of segments is extracted and set as the second search key;

setting a search expression using the plurality of segments, and a logic operator, wherein the logic operator corresponding to a predetermined path drawn by a pointing operation is set in the setting step; and searching the database, based on the first search key and the second search key, by using a search method corresponding to the first search key and the second search key, respectively, wherein the non-text attribute comprises at least one of an image, a photograph, a table, graphics, figures, a picture, a frame, or a line.

* * * * *